United States Patent
Dautrey

(10) Patent No.: US 8,720,514 B2
(45) Date of Patent: May 13, 2014

(54) TIRE HAVING A BELT PLY WITH CORDS DISPOSED ALONG THE CIRCUMFERENCE OF THE TIRE TO REDUCE THE TIRE NOISE

(75) Inventor: Nicolas Dautrey, Chamalieres (FR)

(73) Assignees: Michelin Recherche et Technique S.A., Granges-Paccot (CH); Compagnie Generale des Etablissements Michelin, Clermont-Ferrand (FR)

( * ) Notice: Subject to any disclaimer, the term of this patent is extended or adjusted under 35 U.S.C. 154(b) by 386 days.

(21) Appl. No.: 13/123,039

(22) PCT Filed: Oct. 6, 2009

(86) PCT No.: PCT/EP2009/062983
§ 371 (c)(1),
(2), (4) Date: Aug. 2, 2011

(87) PCT Pub. No.: WO2010/040753
PCT Pub. Date: Apr. 15, 2010

(65) Prior Publication Data
US 2011/0284145 A1    Nov. 24, 2011

Related U.S. Application Data

(60) Provisional application No. 61/116,544, filed on Nov. 20, 2008.

(30) Foreign Application Priority Data

Oct. 8, 2008    (EP) .................................... 08290952

(51) Int. Cl.
*B60C 9/18*    (2006.01)
*B60C 9/22*    (2006.01)

(52) U.S. Cl.
USPC ............ 152/531; 152/526; 152/527; 152/533

(58) Field of Classification Search
USPC .................. 152/526, 527, 531, 532, 533, 537
See application file for complete search history.

(56) References Cited

U.S. PATENT DOCUMENTS 4,140,168 A * 2/1979 Caretta .......................... 152/527
4,293,019 A * 10/1981 Maiocchi ....................... 152/527
(Continued)

FOREIGN PATENT DOCUMENTS

CN    1708415    12/2005
EP    1 559 588    8/2005
(Continued)

OTHER PUBLICATIONS

Kim et al, "The Identification of Sound Generating Mechanisms of Tires", Applied Acoustics, 681/1 2007, pp. 114-133.

*Primary Examiner* — Justin Fischer
*Assistant Examiner* — Robert Dye
(74) *Attorney, Agent, or Firm* — Cozen O'Connor

(57) ABSTRACT

A tire comprising a hooping reinforcement, wherein the axial distance between neighboring portions of the hooping reinforcement is greater than or equal to 0.7 mm and smaller than or equal to 2 mm, with the exception of one first axial region L1 and two second axial regions L2. The axial distance of each of the axial ends of the first axial region L1 from the median plane is greater than or equal to 0.05·S and smaller than or equal to 0.15·S, S being the maximum axial width of the tire. The two regions L2 are provided on both sides of the median plane, each second axial region being centered at an axial distance D2 from the median plane, D2 being greater than or equal to 0.25·S and smaller than or equal to 0.4·S. Each second axial region L2 has an axial width W2 that is greater than or equal to 0.1·S. The sum of the axial widths of the first and second axial regions is smaller than or equal to 0.5·S. The difference between the average axial distance between neighboring portions of the hooping reinforcement in the first and second axial regions L1 and L2, and the distance outside the first and second axial regions L1 and L2 is at least 0.2 mm.

5 Claims, 5 Drawing Sheets

(56) References Cited

U.S. PATENT DOCUMENTS

| | | |
|---|---|---|
| 5,373,885 A | 12/1994 | Yamashita |
| 5,746,853 A * | 5/1998 | Burlacot ................ 152/531 |
| 6,425,426 B1 | 7/2002 | Osborne et al. |
| 6,533,012 B1 * | 3/2003 | Jardine et al. ............. 152/527 |
| 6,883,570 B2 * | 4/2005 | Jardine et al. ............. 152/531 |
| 7,416,006 B2 * | 8/2008 | Maurel ................ 152/526 |
| 2005/0269008 A1 | 12/2005 | Takagi |

FOREIGN PATENT DOCUMENTS

| | | | |
|---|---|---|---|
| JP | 56-071605 | * | 6/1981 |
| WO | WO 2005/025895 | | 3/2005 |

\* cited by examiner

TIRE HAVING A BELT PLY WITH CORDS DISPOSED ALONG THE CIRCUMFERENCE OF THE TIRE TO REDUCE THE TIRE NOISE

RELATED APPLICATIONS

This is a U.S. National Phase Application under 35 USC 371 of International Application PCT/EP2009/062983, filed on Oct. 6, 2009.

This application claims the priority of European patent application no. 08290952.4 filed Oct. 8, 2008 and U.S. provisional patent application No. 61/116,544 filed Nov. 20, 2008, the entire contents of both of which are hereby incorporated by reference.

FIELD OF THE INVENTION

The present invention relates to tires, and in particular to passenger car tires having low noise emission.

BACKGROUND OF THE INVENTION

It is well known that when a tire fitted on a vehicle rolls on a surface, the tire gives rise to an audible sound, which may be unpleasant both for the driver of the vehicle and for the persons in the vicinity of the vehicle. Therefore, tire manufacturers have been trying to reduce the noise emission of tires for a long time.

A great variety of techniques have been proposed. For example, it has been proposed to provide noise absorbers within the tire or the wheel to which the tire is fitted (see, for instance, documents US 2006/0289100 and US 2008/0116612). There have also been numerous attempts to reduce tire noise by adapting the tread pattern, for example via the "variable pitch" technique (see, for instance, document U.S. Pat. No. 4,598,748).

One of the significant contributions to the noise produced by a tire is due to the excitation of the air contained inside the tire cavity: there is an excitation by the road and by the deflection of the tire tread and sidewall when the tire is rolling on a road. The effects caused by acoustic resonance of the air contained in a tire, such as the "first cavity mode" (FCM) have been studied in detail. Document WO 2008/071422, to cite only one example, describes a way to reduce this noise component by providing a resonating cavity in the bead, the cavity being configured to be in fluid communication with the tire cavity.

Notwithstanding all these efforts, there is still a great need for reduction of tire noise, in order to satisfy the ever-increasing demands of car manufacturers and lawmakers.

One promising field of research for noise reduction consists in the study of the vibratory behaviour of the tire itself. It is known (see, for example, the monograph "The tire. Mechanical and acoustical comfort", published by Michelin in 2002, chapter III.3) that the vibratory behaviour of a tire varies according to frequency. Below 30 Hz, the tire acts like a spring. Between 30 Hz and 250 Hz, the tire may be considered to be a multi-mode vibratory system as it has several natural mode shapes, all of which may be grouped into two main categories: radial modes and transversal modes. At frequencies above 250 Hz, the tire mainly vibrates near the contact patch.

The applicant has studied the vibratory behaviour of tires and found that the tire meridian modes have a considerable impact on the noise generated by the tire. "Meridian modes" are understood to designate vibratory modes wherein the tire is deformed in a direction normal to its meridian such as shown in FIG. 6. (For a thorough treatment of vibratory modes of a tire, see also "The identification of sound generating mechanisms of tires" by Byoung Sam Kima, Gi Jeon Kimb and Tae Keun Lee in Applied Acoustics, 68/1 (2007), 114-133.)

Meridian modes are also sometimes referred to as "flexural modes" and classified according to the number of anti-nodes (i.e. points which undergo vibrations between a large positive and large negative displacement, as opposed to nodes, which are points that appear to be standing still) along the tire in a radial section. It has been found that the flexural mode at $5^{th}$ order (i.e. the flexural mode with five anti-nodes in a meridian plane, such as the mode depicted in FIG. 6) are important contributors to tire noise.

SUMMARY OF THE INVENTION

One object of the present invention is to provide a tire with reduced noise emission, and in particular a tire wherein the vibratory behaviour of the tire is modified so as to reduce its noise emission via the flexural mode at $5^{th}$ order.

This object is achieved by a tire comprising:
two beads configured to come into contact with a mounting rim;
two sidewalls extending the beads radially to the outside, the two sidewalls being joined together in
a crown comprising a crown reinforcement extending axially between two axial ends and surmounted by a tread;
a carcass reinforcement comprising a plurality of carcass reinforcing elements, the carcass reinforcement being anchored in the two beads and extending across the sidewalls to the crown;
a hooping reinforcement, arranged radially outside the crown reinforcement, said hooping reinforcement extending from the median plane of the tire axially to the outside, on both sides of the median plane, said hooping reinforcement being formed from at least one reinforcing element oriented circumferentially.

In a tire according to an embodiment of the invention, in any radial section, the axial distance between neighbouring portions of the hooping reinforcement is greater than or equal to 0.7 mm and smaller than or equal to 2.0 mm, with the exception of:

(a) one first axial region L1 having an intersection with the median plane of the tire, the axial distance of each of the axial ends of the first axial region L1 from the median plane being greater than or equal to 0.05·S and smaller than or equal to 0.15·S (and preferably smaller than or equal to 0.10·S), S being the maximum axial width of the tire, and (b) two second axial regions L2, provided on both sides of the median plane, each second axial region being centred at an axial distance D2 from the median plane, D2 being greater than or equal to 0.25·S and smaller than or equal to 0.4·S, S being the maximum axial width of the tire, each second axial region L2 having an axial width W2 that is greater than or equal to 0.1·S.

The axial distance between neighbouring portions of the hooping reinforcement in the said first and second axial regions L1 and L2 is smaller than 0.7 mm or greater than 2.0 mm. The sum of the axial widths of the first and second axial regions is smaller than or equal to 0.5·S (and preferably smaller than or equal to 0.40·S), S being the maximum axial width of the tire.

Moreover, the difference between:
(a) the average axial distance between neighbouring portions of the hooping reinforcement in the first and second axial regions L1 and L2, and (b) the average axial distance between neighbouring portions of the hooping reinforcement outside the first and second axial regions L1 and L2, is at least 0.2 mm.

This particular arrangement of the hooping reinforcement allows to significantly reduce the noise emission of the tire via the flexural mode at $5^{th}$ order.

According to a preferred embodiment, the first axial region L1 is centred with respect to the mid plane and wherein the two second axial regions L2 are arranged symmetrically with respect to the median plane of the tire.

The noise reduction is obtained as a consequence of the variation of the axial distance between neighbouring portions of the hooping reinforcement in the first and second axial regions L1 and L2, irrespective of whether this axial distance is modified in the same way in the axial regions L1 and L2. Better results are, however, obtained if the variation is the same in all three axial regions, i.e. if the axial distance between neighbouring portions of the hooping reinforcement is greater than 2.0 mm in the first axial region L1 and the two second axial regions L2, or, alternatively, if the axial distance between neighbouring portions of the hooping reinforcement is smaller than 0.7 mm in the first axial region L1 and the two second axial regions L2. Best results have been obtained with tires wherein the average distance between neighbouring portions of the hooping reinforcement is the same in the first axial region L1 and the two second axial regions L2.

Preferentially, the axial distance between neighbouring portions of the hooping reinforcement outside the first axial region L1 and the two second axial regions L2 is substantially constant and/or the axial distance between neighbouring portions of the hooping reinforcement in the first axial region L1 and the two second axial regions L2 is substantially constant.

DETAILED DESCRIPTION OF THE DRAWINGS

Figure 1:
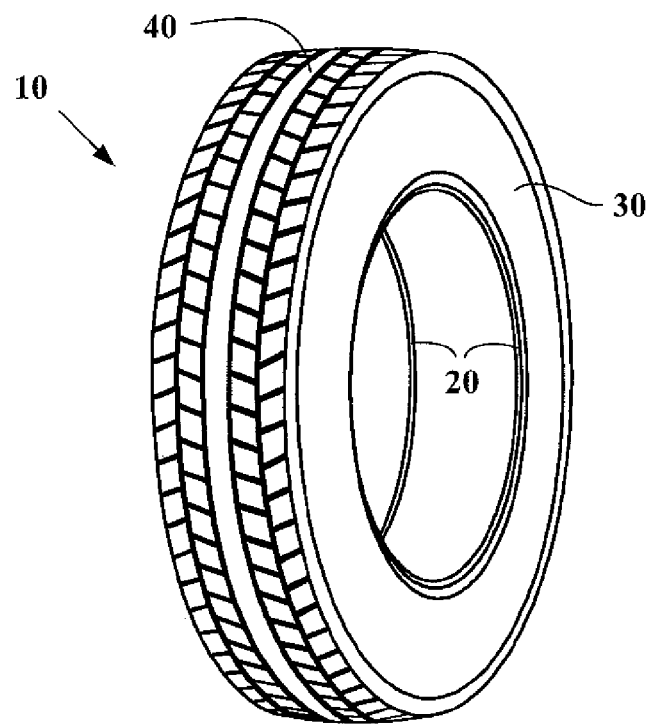
FIG. 1 shows a perspective view of a tire according to the prior art.

When using the term "radial" it is necessary to distinguish several different uses of the word by those skilled in the art. Firstly, the expression refers to a radius of the tire. It is in this sense that it is said of a point P1 that it is "radially inside" a point P2 (or "radially on the inside" of point P2) if it is closer to the axis of rotation of the tire than point P2. Conversely, a point P3 is said to be "radially outside" a point P4 (or "radially on the outside" of point P4) if it is further away from the axis of rotation of the tire than point P4. One is said to advance "radially to the inside (or to the outside)" when advancing in the direction of smaller radii (or larger radii). The expressions "radially innermost" and "radially outermost" are used analogously. This meaning of the term also applies in the context of radial distances.

In contrast, a thread or a reinforcement is known as "radial" when the thread or the reinforcing elements of the reinforcement form with the circumferential direction an angle greater than or equal to 80° and less than or equal to 90°. Specifically in the present document, the term "thread" has to be understood in a very general sense and includes threads in the form of monofilaments, multifilaments, a cable, a yarn or equivalent assembly, irrespective of the material forming the thread or the surface treatment to promote its connection with the rubber.

A "radial cross-section" or "radial section" is a cross section or a section along a plane which contains the axis of rotation of the tire. Such a plane can also be referred to as a "meridian plane" or a "meridian section." A "meridian" corresponds to the intersection of the outer surface of the tire with a meridian plane.

An "axial" direction is a direction parallel to the axis of rotation of the tire. A point P1 is said to be "axially inside" a point P2 (or "axially on the inside" of point P2) if it is closer to the median plane of the tire than point P2. Conversely, a point P3 is said to be "axially outside" a point P4 (or "axially on the outside" of point P4) if it is further away from the median plane of the tire than point P4. The "median plane" of the tire is the plane which is perpendicular to the axis of rotation of the tire and which is located equidistant from the annular reinforcing structures of each bead.

A "circumferential" direction is a direction which is perpendicular both to a radius of the tire and the axial direction.

Two reinforcing elements are said to be "parallel" in this document when the angle formed between the two elements is less than or equal to 20°.

Within the scope of this document, the expression "rubber mix" denotes a rubber composition comprising at least one elastomer and a filler.

A "hooping reinforcement" or "hooping layer", also known as a "bracing layer", is a layer comprising circumferentially aligned reinforcing threads (similar to hoops) which hinder the crown reinforcement from expanding when the tire is rolling at high speed.

The expression "neighbouring portions of the hooping reinforcement" refers to adjacent portions of the hooping reinforcement in a radial section of the tire. Two portions of the hooping reinforcement are considered adjacent when there is no other portion of the hooping reinforcement between them. A precise definition of the term "neighbouring" is given below. If the hooping reinforcement is formed by a single thread that is wrapped around the circumference of the tire, the neighbouring portions correspond to adjacent intersections of the thread with a given radial plane. If the hooping reinforcement is formed by a plurality of threads, each of which forms a single loop, the neighbouring portions correspond to the intersections of adjacent threads with said radial plane.

FIG. 1 schematically depicts a tire 10 according to the prior art. The tire 10 comprises two beads 20 configured to come into contact with a mounting rim (not shown), two sidewalls 30 extending the beads 20 radially to the outside, the two sidewalls being joined together in a crown comprising a crown reinforcement (not visible in FIG. 1) surmounted by a tread 40.

Figure 2:
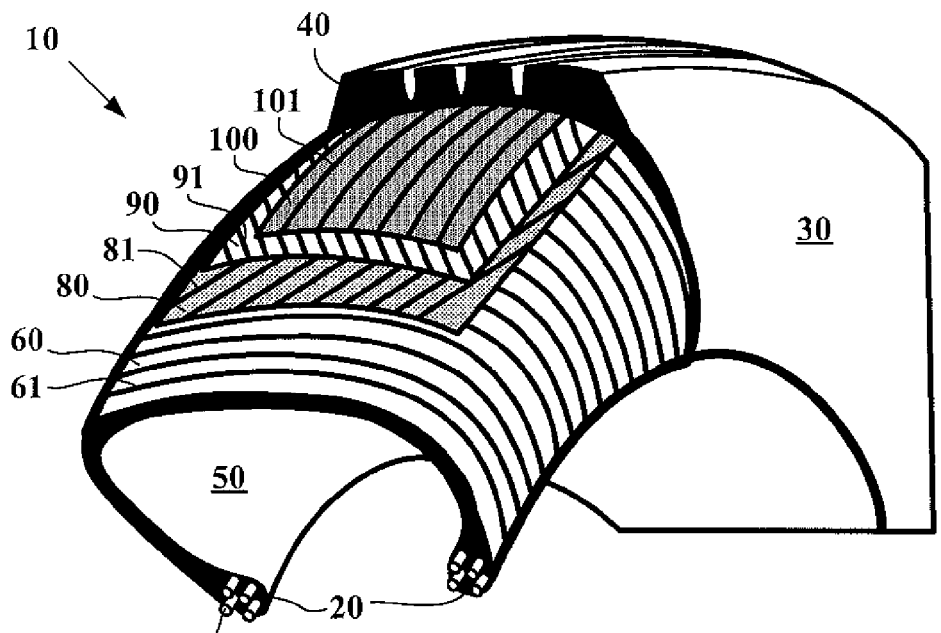
FIG. 2 shows a cutaway perspective view of a portion of a tire according to the prior art.

FIG. 2 shows a partial perspective view of a tire 10 according to the prior art and illustrates the different components of the tire. The tire 10 comprises two beads 20, each comprising annular reinforcing structures 70 which maintain the tire 10 on a rim (not represented), two sidewalls 30 extending the beads 20 radially to the outside, the two sidewalls 30 being joined together in a crown. The crown comprises a crown reinforcement comprising two plies 80 and 90. Each of the plies 80 and 90 is reinforced by thread-like reinforcing elements 81 and 91 which are parallel to one another in each layer and the reinforcing elements of one layer extending crosswise with respect to those of the other, forming with the circumferential direction angles of between 10° and 70°. The tire 10 also comprises a carcass reinforcement 60 comprising a plurality of threads 61 coated with a rubber mix. The carcass reinforcement 60 is anchored in the two beads 20 and extends across the sidewalls 30 to the crown. The tire further comprises a hooping reinforcement 100 arranged radially outside the crown reinforcement, said hooping reinforcement being formed from at least one reinforcing element 101 oriented circumferentially and wound in a spiral. A tread 40 is placed on the hooping reinforcement. It is this tread 40 which ensures the contact of the tire 10 with the road. The inner surface of the tire, i.e. the surface that comes in contact with the gas used to inflate the tire once the tire is mounted on its rim and inflated, is covered with an inner liner 50 made from a rubber mix that is impermeable to said gas.

Figure 3:
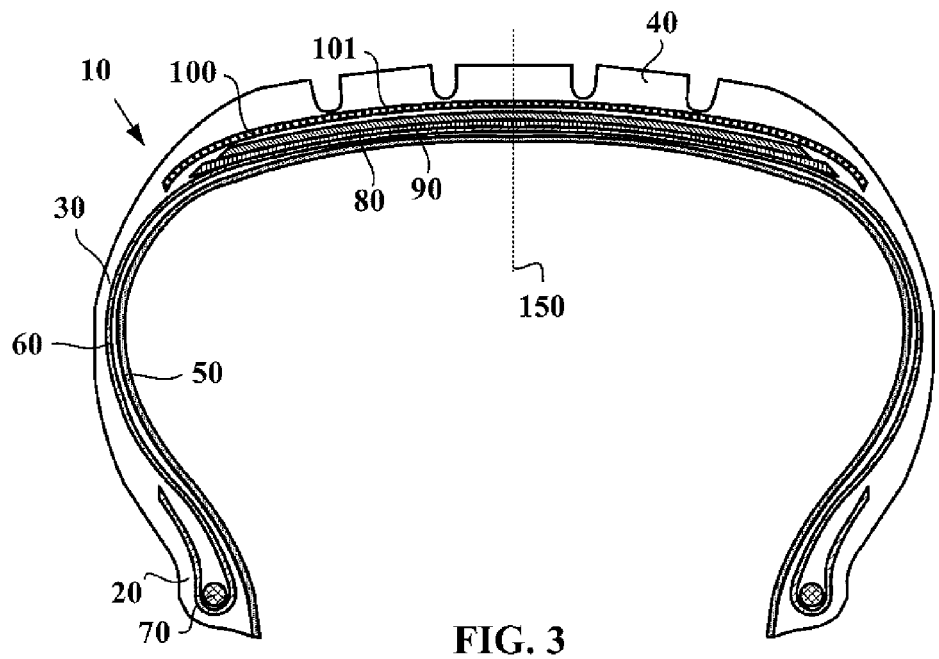
FIG. 3 shows, in radial section, a part of a tire.

FIG. 3 shows a tire 10 similar to the tire of FIG. 2 in radial section. The median plane 150 is indicated by means of a dotted line 150.

Figure 4:
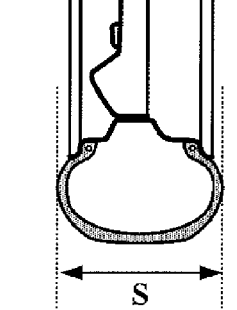
FIGS. 4 and 5 illustrate geometrical features of the tire of FIG. 3.

FIG. 4 schematically represents the tire 10 of FIG. 3 after it has been mounted on a wheel 5 and inflated. It illustrates how the "radial height" H of the tire and its "maximum axial width" S are measured.

The "radial height" H is understood to be the radial distance between the radially innermost point of the annular reinforcing structures 70 and the radially outermost point 41 of the tread. It is determined when the tire is mounted on the wheel 5 and inflated to its service pressure. The tire does not carry any load when the measurement is performed.

As its name indicates, the "maximum axial width" S corresponds to the axial width of the tire at its maximum, again when the tire is mounted on the wheel 5 and inflated to its service pressure.

Figure 6:
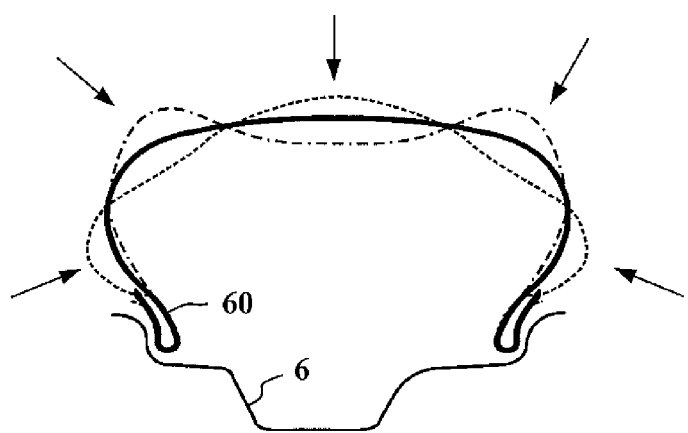
FIG. 6 illustrates the flexural mode at $5^{th}$ order.

When a tire such as the tire 10 of FIG. 3, is mounted on a vehicle and rolls on a road, it vibrates and generates sound. Although the vibratory behaviour of a complex composite structure such as a tire is necessarily very complex, it is possible to identify several vibratory modes that contribute significantly to noise emission. One of them is the so-called flexural mode at $5^{th}$ order. The corresponding vibratory pattern is schematically represented in FIG. 6. For the sake of clarity, only the carcass reinforcement 60 and the rim 6 on which the tire is mounted are shown, in a radial section. The solid fine corresponds to the carcass reinforcement at rest. The dashed line and the dash-dotted line correspond to (exaggerated) positions of the carcass reinforcement at various stages of the vibratory motion. When the flexural mode is activated, the tire is deformed in a direction normal to its meridian. It can be seen that there are five anti-nodes (i.e. points which undergo vibrations between a large positive and large negative displacement, as opposed to nodes, which are points that appear to be standing still) along the tire in a radial section. The anti-nodes are indicated by means of arrows.

The tires according to the invention are capable of reducing noise generation by hindering the development of flexural mode at $5^{th}$ order type vibrations of the tire. This is obtained by using a particular hooping reinforcement. FIGS. 7 to 12 show several embodiments of the invention. As the invention only concerns the hooping reinforcement, only the crown and the radially outer half of the sidewalls are shown.

Figure 7:
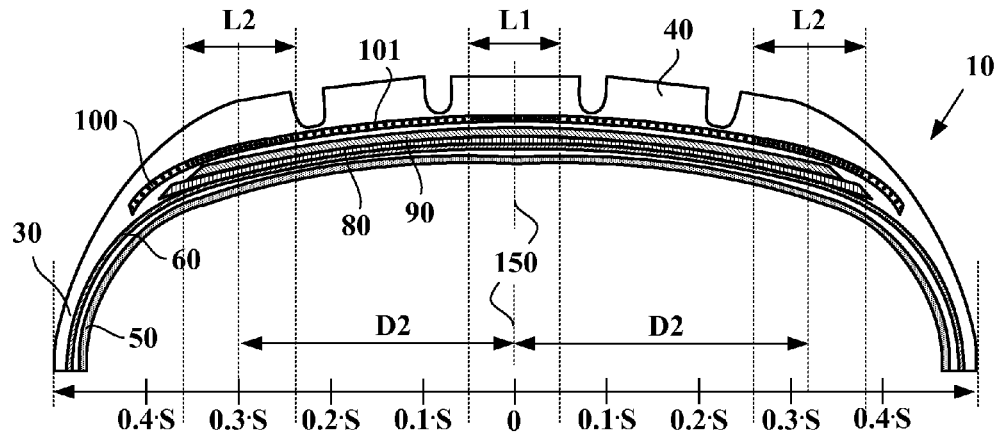
FIGS. 7 to 12 show, in radial section, a part of a tire according to several embodiments of the invention.

FIG. 7 show a first embodiment of the tire according to the invention. In any radial section, the axial distance D between neighbouring portions of the hooping reinforcement 100 is constant and equal to 1.0 mm, with the exception of three zones:

There is one axially central first axial region L1 which has an intersection with the median plane 150 of the tire. The axial distance of each of the axial ends of the first axial region L1 from the median plane is equal to 0.05·S, S being the maximum axial width of the tire.

Moreover, there are two second axial regions L2, provided on both sides of the median plane 150, each second axial region being centred at an axial distance D2 from the median plane. In this particular embodiment, D2 is equal to 0.3·S for the one and 0.32·S for the other second axial regions L2. Each of the second axial regions L2 has an axial width W2 equal to 0.1·S.

The axial distance D between neighbouring portions of the hooping reinforcement 100 is constant and equal to 0.5 mm in the first and second axial regions L1 and L2. Thus, the difference between the average axial distance between neighbouring portions of the hooping reinforcement 100 in the said first and second axial regions L1 and L2, and the average axial distance between neighbouring portions of the hooping reinforcement outside the said first and second axial regions L1 and L2, is equal to 0.5 mm.

Figure 5:
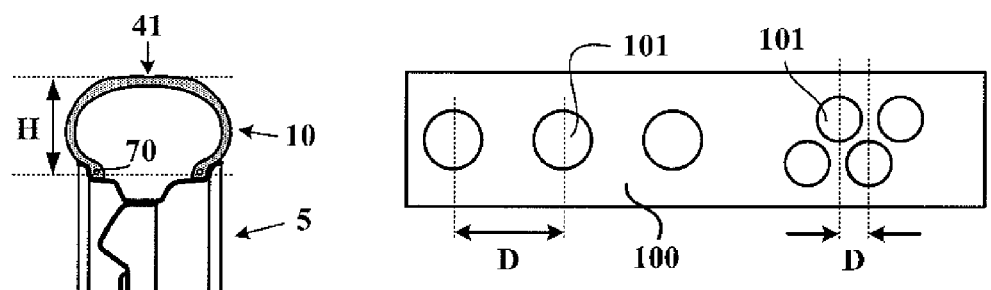

Within the frame of this document, the "axial distance D between neighbouring portions of the hooping reinforcement" corresponds to the axial distance between the centres of neighbouring portions of the hooping reinforcement. If the sections of the portions of the hooping reinforcement are circular, the distance is measured between the centres of neighbouring circles, as shown in FIG. 5. If the sections have a more complex shape, the distance is measured between the centres of gravity of the sections.

As can be seen from the right hand side of FIG. 5, this distance can be smaller than the diameter of each of the neighbouring portions of the hooping reinforcement. This is the case when the neighbouring portions do not have the same radial position. It should be noted that the concept of "neighbouring" portions does not imply that these portions have the same radial position. In order to determine the "neighbouring portions" of a given portion P of the hooping reinforcement, one considers a first set of portions comprising all portions that are axially inside said portion P and a second set of portions comprising all portions that are axially outside said portion P. The "neighbouring" portions are the portions that are nearest to said portion P in the first set and in the second set. Therefore, each portion P has at least two "neighbouring portions" (i.e. the nearest portion in the first set and the nearest portion in the second set), but their number can exceed two if two or more portions in the first and/or the second sets have the same distance from portion P.

The sum of the axial widths of the first and second axial regions for the embodiment of FIG. 7 is equal to 0.3·S.

It will be noted that the arrangement of the second axial regions L2 is not symmetrical. Such an arrangement may be preferred when the tire as such (e.g. its tread pattern, etc.) is not symmetrical. However, the invention also covers strictly symmetrical arrangements.

Figure 8:
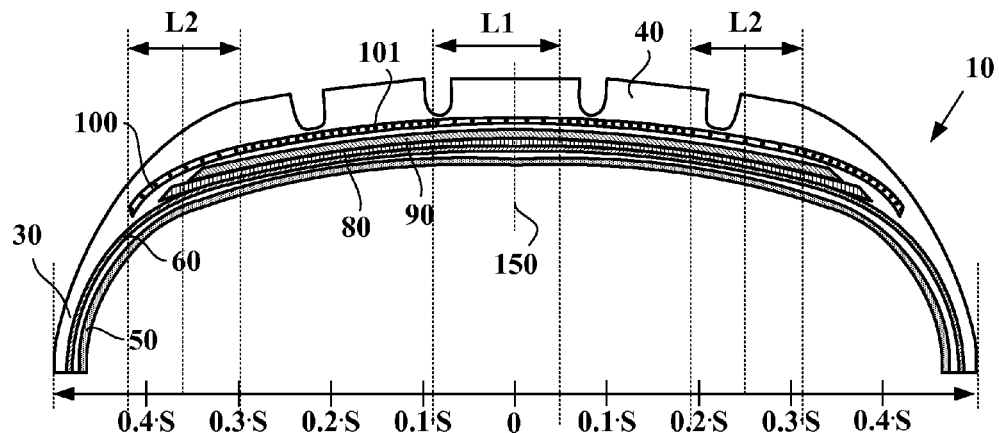

FIG. 8 shows a second embodiment of the tire according to the invention. In this embodiment, the central first axial region L1 is not centred with respect to the median plane 150 of the tire. The axial distances of the axial ends of the first axial region L1 from the median plane are equal to 0.09·S and 0.05·S, respectively. One of the second axial regions L2 (width: 0.12·S) extends until the end of the hooping reinforcement 100, the other second axial region L2 (width: 0.12·S) is arranged closer to the median plane 150.

The axial distance D between neighbouring portions of the hooping reinforcement 100 is constant and equal to 2.2 mm in the first and second axial regions L1 and L2.

Quite surprisingly, a reduction of the tire noise is obtained both for an increase or a reduction of the axial distance D between neighbouring portions of the hooping reinforcement 100 in the first and second axial regions L1 and L2 with respect to the rest of the hooping reinforcement 100.

Figure 9:
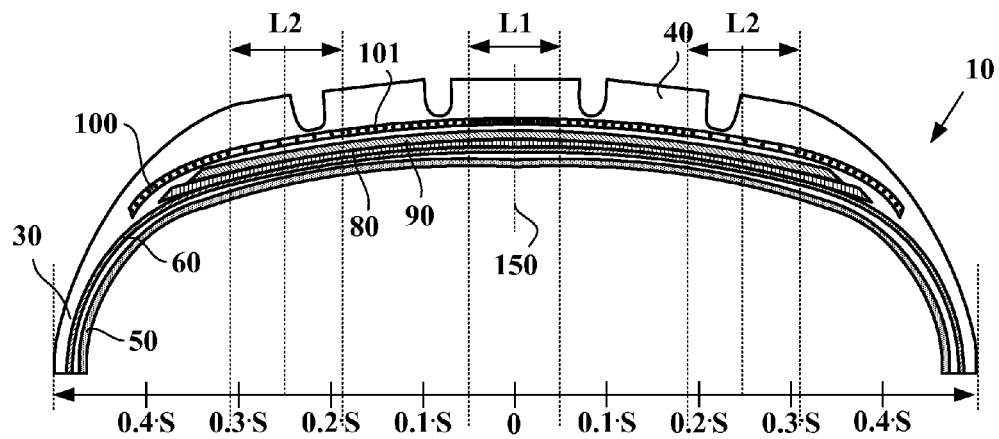

It is also possible to obtain a reduction of tire noise by reducing the axial distance D between neighbouring portions of the hooping reinforcement 100 in the first axial region L1 and by increasing the axial distance D between neighbouring portions of the hooping reinforcement 100 in the second axial regions L2, as shown in FIG. 9. This embodiment of the tire according to the invention comprises a symmetrical arrangement of the second axial regions L2.

Figure 10:
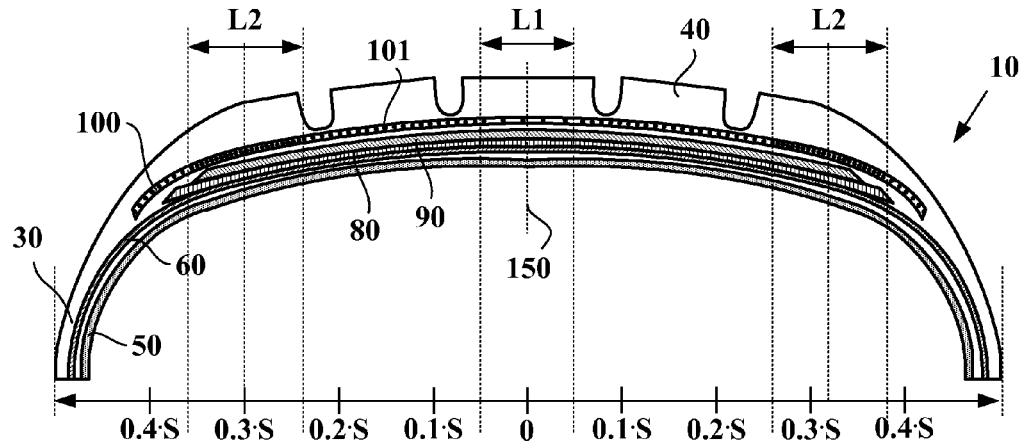

FIG. 10 represents another embodiment of the tire according to the invention. Here the axial distance D between neighbouring portions of the hooping reinforcement 100 is increased in the first axial region L1 and reduced in the second axial regions L2.

Figure 11:
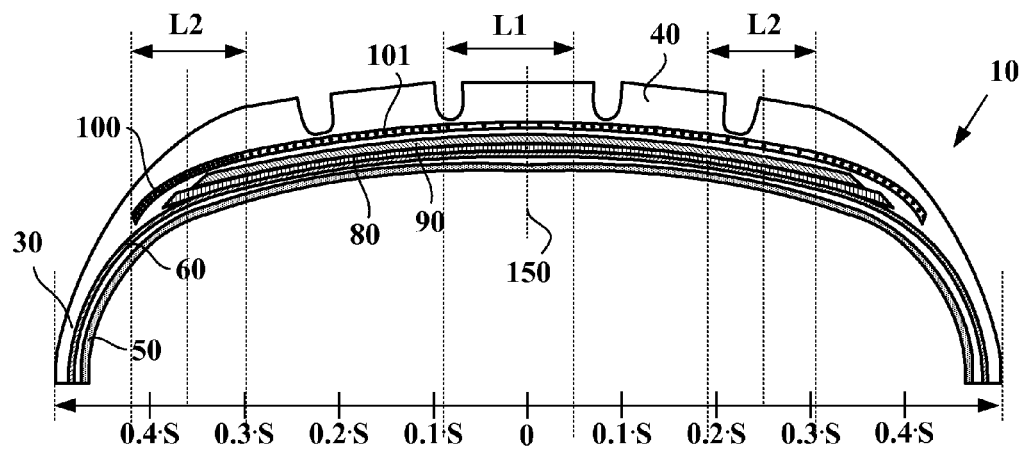
Figure 12:
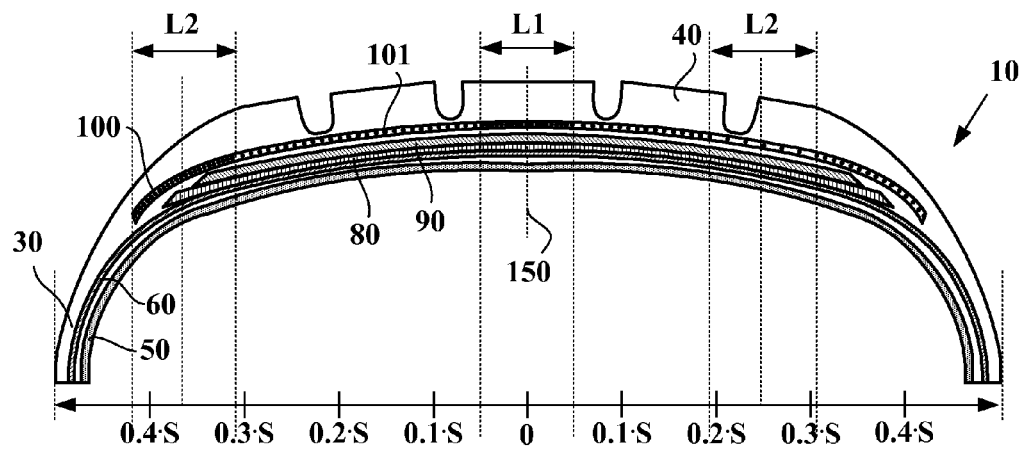

Still other variants are shown in FIGS. 11 and 12. In the embodiment depicted in FIG. 11, the axial distance D between neighbouring portions of the hooping reinforcement 100 is increased in the first axial region L1 and one of the second axial regions L2 and reduced in the other second axial region L2. In the embodiment depicted in FIG. 12, the axial distance D between neighbouring portions of the hooping reinforcement 100 is reduced in the first axial region L1 and one of the second axial regions L2 and increased in the other second axial region L2.

In all these examples, the axial distance D is constant within each axial region L1 or L2 and outside these regions (with the exception of the regions of transition, of course). This is not a limiting feature of the invention. It is possible to have varying axial distances D within each region as long as the axial distances between neighbouring portions of the hooping reinforcement are greater than or equal to 0.7 mm and smaller than or equal to 2.0 mm outside the first and second axial regions L1 and L2 and smaller than 0.7 mm or greater than 2.0 mm within the first and second axial regions L1 and L2.

Moreover, the average distance between neighbouring portions of the hooping reinforcement does not necessarily have to be the same in the first axial region L1 and/or the two second axial regions L2.

Figure 13:
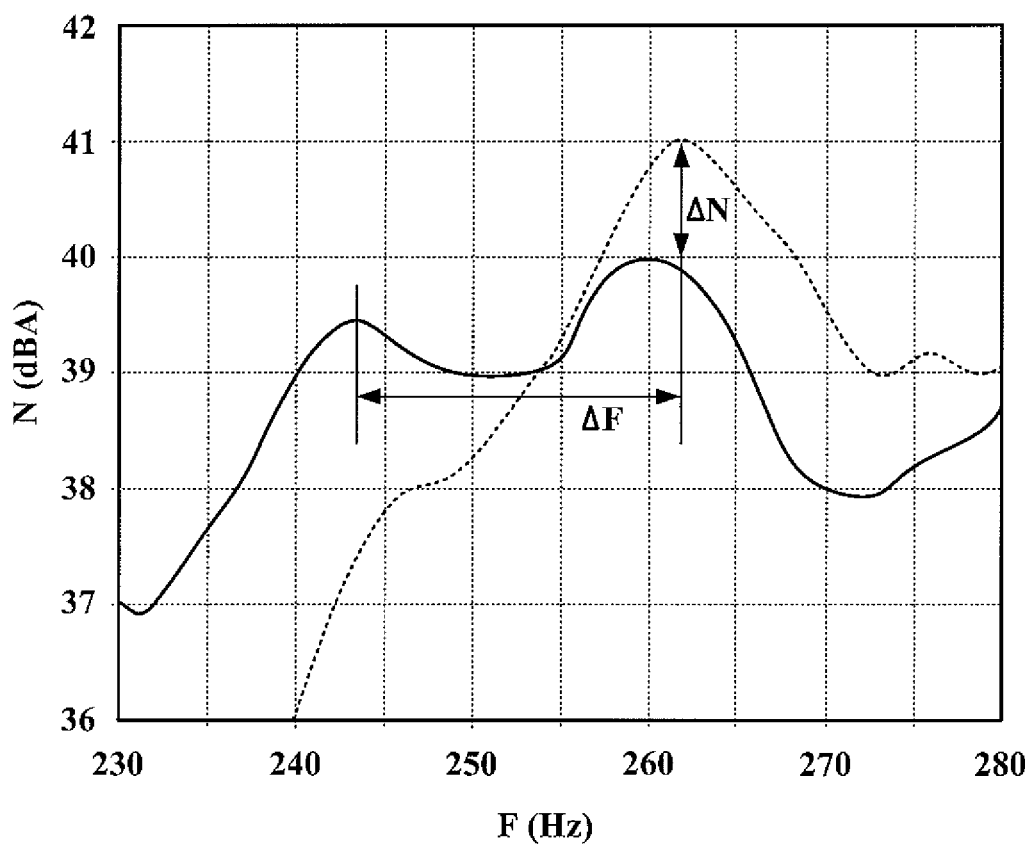
FIG. 13 shows results obtained with a tire according to the invention, as compared to a reference tire.

FIG. 13 shows results obtained with a tire according to the invention, as compared to a reference tire. The reference tire corresponds to the tire of FIG. 3, of dimension 225/55 R17 having a hooping layer made of nylon cords with a distance D of 1 mm, except in the axial regions L1 and L2, where the distance is 10 mm. The reference tire (dotted line) was compared to a tire corresponding to FIG. 8 (solid line). As can be seen, the noise level N (in dBA) as a function of the frequency F (in Hertz) has a lower peak value (noise peak decrease ΔN) and is shifted to lower frequencies (frequency shift ΔF).

The invention claimed is:

1. A tire comprising:
   two beads configured to come into contact with a mounting rim;
   two sidewalls extending the beads radially to the outside;
   a crown joining the two sidewalls together and comprising
      a crown reinforcement extending axially between two axial ends and surmounted by a tread;
      a carcass reinforcement comprising a plurality of carcass reinforcing elements, the carcass reinforcement being anchored in the two beads and extending across the sidewalls to the crown;
      a hooping reinforcement, arranged radially outside the crown reinforcement, said hooping reinforcement extending from the median plane of the tire axially to the outside, on both sides of the median plane, said hooping reinforcement being formed from at least one reinforcing element oriented circumferentially;
   wherein in any radial section, the axial distance D between neighbouring portions of the hooping reinforcement is greater than or equal to 0.7 mm and smaller than or equal to 2 mm, with the exception of:
   one first axial region L1 having an intersection with the median plane of the tire, the axial distance of each of the axial ends of the first axial region L1 from the median plane being greater than or equal to 0.05·S and smaller than or equal to 0.15·S, S being the maximum axial width of the tire, and
   two second axial regions L2, provided on both sides of the median plane, each second axial region being centred at an axial distance D2 from the median plane, D2 being greater than or equal to 0.25·S and smaller than or equal to 0.4·S, S being the maximum axial width of the tire, each second axial region L2 having an axial width W2 that is greater than or equal to 0.1·S;
   the sum of the axial widths of the first and second axial regions being smaller than or equal to 0.5·S, S being the maximum axial width of the tire, the axial distance D between neighbouring portions of the hooping reinforcement in the said first and second axial regions L1 and L2 being smaller than 0.7 mm or greater than 2.0 mm,
   wherein the difference between:
      the average axial distance between neighbouring portions of the hooping reinforcement in the said first and second axial regions L1 and L2, and
      the average axial distance between neighbouring portions of the hooping reinforcement outside the said first and second axial regions L1 and L2,
   is of at least 0.2 mm; and
      wherein the axial distance between neighbouring portions of the hooping reinforcement is greater than 2.0 mm in the first axial region L1 and the two second axial regions L2.

2. The tire according to claim 1, wherein the first axial region L1 is centred with respect to the mid plane and wherein the two second axial regions L2 are arranged symmetrically with respect to the median plane of the tire.

3. The tire according to claim 1, wherein the average distance between neighbouring portions of the hooping reinforcement is the same in the first axial region L1 and the two second axial regions L2.

4. The tire according to claim 1, wherein the axial distance between neighbouring portions of the hooping reinforcement outside the first axial region L1 and the two second axial regions L2 is substantially constant.

5. The tire according to claim 1, wherein the axial distance between neighbouring portions of the hooping reinforcement in the first axial region L1 and the two second axial regions L2 is substantially constant.

* * * * *